April 14, 1936.  W. KANGRO ET AL  2,037,241

ARRANGEMENT OF THE REACTION CHAMBER FOR THE TREATMENT OF MATERIAL

Filed Dec. 1, 1932  3 Sheets-Sheet 1

Inventors
Walther Kangro
Agnes Lindner
By Bean & Brooks Attorneys

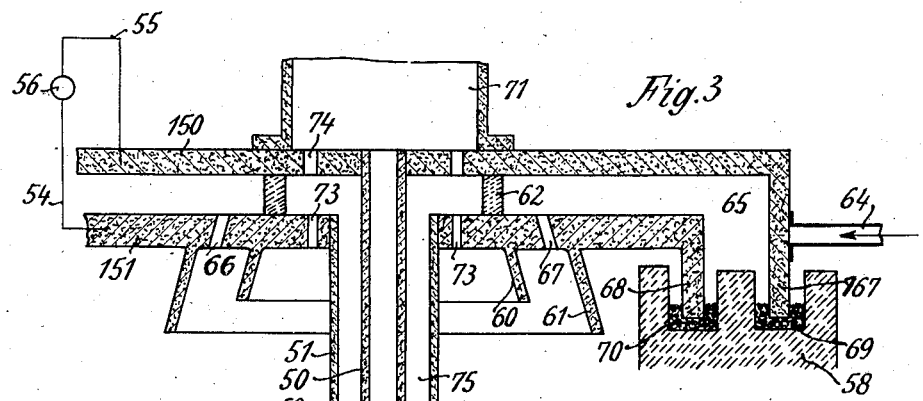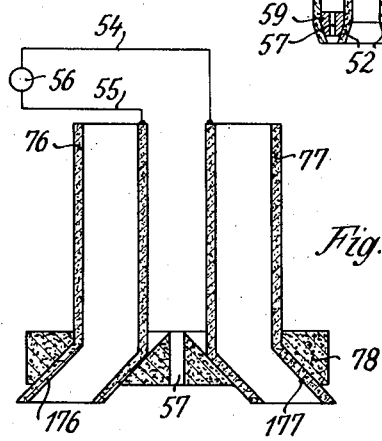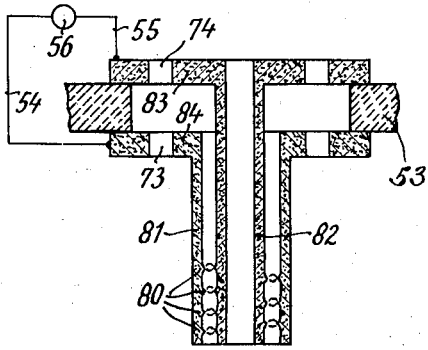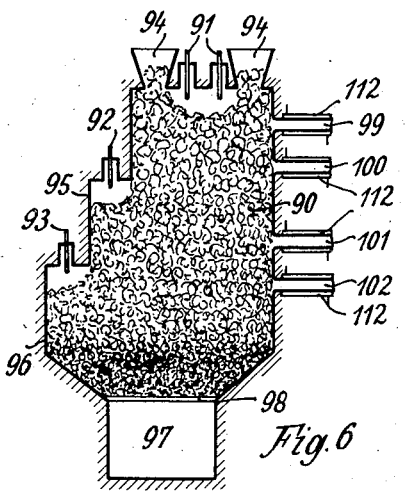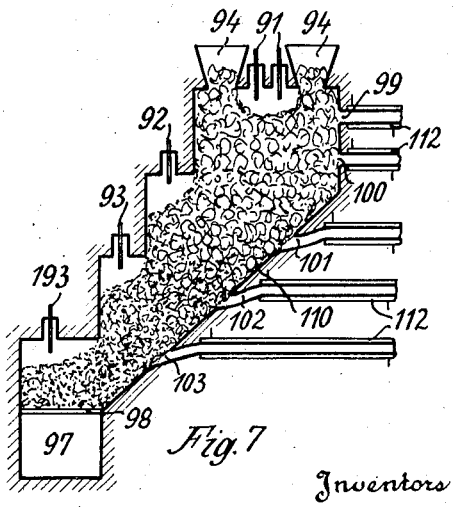

Patented Apr. 14, 1936

2,037,241

UNITED STATES PATENT OFFICE 2,037,241

ARRANGEMENT OF THE REACTION CHAMBER FOR THE TREATMENT OF MATERIAL

Walther Kangro and Agnes Lindner, Brunswick, Germany

Application December 1, 1932, Serial No. 645,319
In Germany December 4, 1931

16 Claims. (Cl. 23—277)

This invention relates to reacting chambers commonly used in the treatment of materials such as ores, residues of ores, mixtures of oxides, mixtures of sulfides, ceramic raw materials, inorganic pigments or the like, with highly active gases for obtaining reaction products particularly of a volatile nature.

Heretofore, in carrying out processes in these chambers on a large scale, difficulties arose owing to the fact that, at the prevailing temperatures, the active gases tend to react not only with the material to be treated, but also with the material usually employed for constructing the chamber walls. This is essentially true if halogens or halogen compounds, particularly chlorine or hydrochloric acid, are used. Such reaction of the gases with the material of the chamber has a destructive effect. Since the tendency of the gas to react with the material of the chamber increases with the temperature and in fact also with the pressure, the danger of an obnoxious reaction is extremely great at the place where the hot gas, e. g., heated chlorine, passes the material of its inlet port into the reaction chamber.

Although materials for the construction of the reaction chamber are available which are adequate to withstand the obnoxious effect of the hot active gases there are no materials, or at least none at reasonable prices, capable of withstanding the effect of ternary reactions which may occur where the active gas, the material of the chamber and the material to be treated meet, or where two different materials come into contact with one another in the construction of the chamber walls.

One of the principal objects of the invention is to provide a reaction chamber for the purpose indicated above which, although constructed of conventional, low priced material will be capable of withstanding the effect of the heated active gas, particularly of heated chlorine.

Another highly important object of the invention consists in providing a reaction chamber of two parts, one of which forms the walls of the chamber and the other one forms the cover of the chamber, the material of the cover of the chamber being such as to be non-reacting with the heated active gas at the highest temperature occurring in the reaction chamber, and non-reacting with the material of the wall in presence of the gas at a somewhat lower temperature, and the material of the walls being such as to be non-reacting with the material of the cover and with the material to be treated in presence of the active gas at a temperature lower than the highest temperature occurring in the reaction chamber.

It is a further object of the invention to feed the heated gas from the cover of the reaction chamber and to arrange the outlet of the volatile reaction products at a convenient place or places.

It is a further object of the invention to provide a reaction chamber having a reaction zone in which the material to be treated is located, and a gas filled zone on top of the material to be treated which gas zone must be passed by the gas on its way from the inlet port or ports in the cover of the chamber to the material to be treated.

It is a further object of the invention to arrange the joints of the chamber cover and walls at such places where a lower temperature prevails than that prevailing at the inlet ports for the heated gas.

It is a further object of the invention to cool parts of the reaction chamber in order to maintain them at a temperature lower than that of the inflowing heated active gas.

It is a further object of the invention to heat the passages of the inlet ports of a reaction chamber in order to increase the temperature of the active gas.

A further object of the invention consists in employing means for electrically heating the active gas while it passes the inlet passages or ports of a reaction chamber.

A further object of the invention consists in the provision of means for preventing the material of the cover from touching the material of the walls of the reaction chamber at the joints of the cover and the walls.

A further object of the invention is to provide means for continuously charging the reaction chamber with the material to be treated and for continuously removing the reaction products and the residues.

A further object of the invention consists in the arrangement of a plurality of inlet ports for the gas in echelons located to one side of, and beneath one another, and in the arrangement of a plurality of outlet ports for the reaction products whereby certain outlet ports are coordinated with certain inlet ports.

Another object of the invention consists in the arrangement of a slanting wall of the reaction chamber with a plurality of outlet ports for the reaction products, and of a plurality of gas inlet ports forming echelons.

Further objects and advantages of the invention will more fully appear from the following description taken in connection with the accompanying drawings which show by way of example preferred embodiments of the invention.

Referring to the drawings:

Fig. 3 is a cross-section, on a larger scale, of electrically heated supply pipes for gases;

Fig. 4 is a cross-section of another form of electrical heating arrangement for the gas supply pipes;

Fig. 5 is a cross-section of still another structure for heating the supply pipes electrically;

Fig. 6 is a cross-section through a reaction chamber with the jacket omitted;

Fig. 7 is a cross-section similar to Fig. 6, of another form of reaction chamber;

Figure 1:
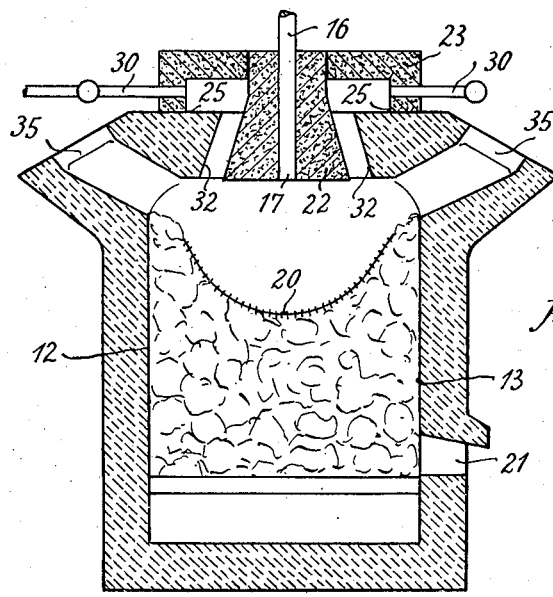
Fig. 1 is a cross-section through the improved reaction chamber showing its internal structures.

Referring to Fig. 1 of the drawing 11 is a reaction chamber or space, the walls of which consist of a furnace material per se liable to be attacked by the gases. If, for instance, iron ores are to be treated with highly heated chlorine gas, e. g. to a temperature of 2000° C., the wall of the furnace will be constructed of one of the customary ceramic materials, such as quartz, sand, clay, sillimanite, which are capable of withstanding high temperatures, but which themselves are unable to withstand highly heated chlorine. The highly heated chlorine is supplied by the pipe 16 through the chamber top and is blown from the nozzle 17 as an unenclosed or free jet under pressure upon the quantity of ore located in the furnace chamber.

Due to the arrangement of the unenclosed jet a trough-shaped reaction zone 20 is formed from which the iron chloride formed escapes downward and preheats the raw material located in the furnace chamber. Finally it escapes through a discharge channel 21, the details of which are not shown here as they do not form part of the invention.

As a result of this arrangement, the zone of highest temperature and of the highest reacting power is situated in the central part of the material to be treated; and the reacting power decreases from this part in every direction, so that at the walls, the danger of obnoxious reactions is avoided, as a result of the lower temperature prevailing there, and of the decreased reactionary powers of the gas resulting from the change which has taken place in the nature of the gas in the zone of reaction.

In order to exclude undesirable reactions along the path between the point of admission of the highly active gas and the reaction zone along the walls confining the reaction chamber or parts of the structure, the assailability of the construction material between the point of admission and the reaction zone along the walls confining the reaction chamber or parts of the structure, is so chosen, that its assailability or liability to be attacked decreases inversely to the direction of the temperature gradient. In the example of the furnace illustrated in the drawings the supply nozzle 22 and, if desired, also the bell or dome 23 covering the furnace space are thus constructed of a material inert to the highly active gas, in the present case, for instance, carbon, graphite and the like. The coal utilized is itself not liable to be attacked by the chlorine, not even in the highly heated state, while by the long path along the wall up to the border line between the furnace material and the dome at 25 an adequate seal is provided against the active chlorine.

In order to maintain the temperature low at this location, at which meet the carbon or any other material inert to the gas supplied, together with the furnace material assailable by the highly active gas, and finally the highly active gas, the parts of the structure may be cooled by the customary means, by making them hollow, for instance, and passing a current of liquid or gas through them. According to another feature of our invention the space traversed by the heat radiation may be brought to the inert state by means of additional currents of gas and be maintained in that state. Additional currents of gas may be employed, e. g., nitrogen or rare gases, and such gases remain inactive during the process. On the other hand, the highly active gas itself, but in the inactive or inert state, for instance at low temperature, may be introduced.

For this purpose in the example illustrated the dome or bell 23 is provided with pipes 30, through which the inactive gas is supplied to the parts to be protected.

By suitably proportioning the pressure, the velocity, the temperature and choosing the nature of this additional current, the temperature may be kept on the desired low level, and it is possible to protect the furnace material not only at the transition point between the attackable and the non-attackable material, but also at its border line 32 up to the reaction zone.

The arrangement selected is particularly favorable in so far as it directly brings about the strongest cooling at the border line 25, which in the example chosen is already endangered at a comparatively low temperature, about 500° C., while the more remote furnace wall at 32 is still able to resist temperatures of 1200 to 1300° C.

The raw material is preferably supplied from the upper edge of the opening, for example through charge openings 35 distributed around the periphery in any desired number, so that the formation of the trough-shaped reaction zone, which is so advantageous to the protection of the furnace, is greatly promoted thereby.

For sealing all spaces or chambers in communication with the furnace, as well as the supply pipes of the highly active gas, of the raw materials or also the discharge ducts or passages, packing, jointing or sealing devices may be provided outside of and spaced from the furnace, so that the packing structure and the furnace structure are completely separated from each other. In this way the most favorable state, as regards temperatures and working conditions, is attained in each individual case; the temperature in the reaction zone may be kept as high as desired, and the temperature at the wall of the furnace is by the arrangement according to the invention reduced to such an extent, that a reaction with the material is effectively prevented, while the seal itself located outside the furnace may be kept at any desired low temperature.

Figure 2:
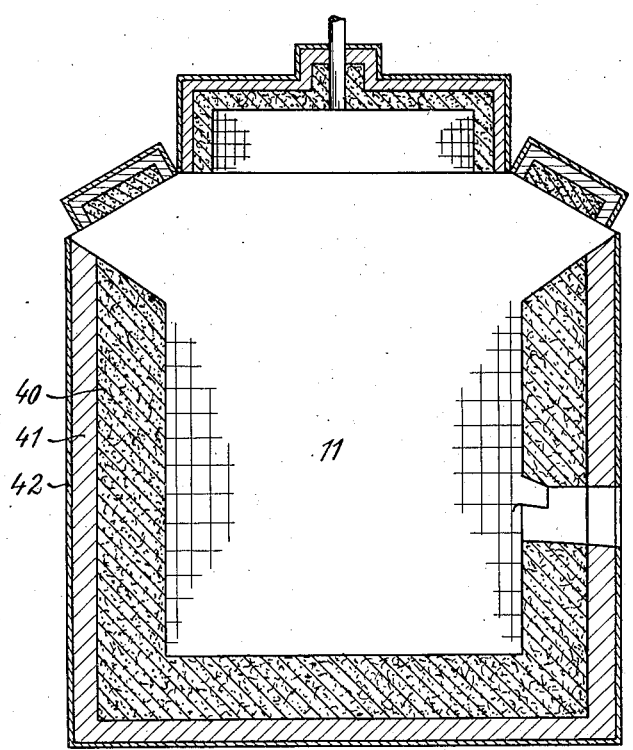
Fig. 2 is a cross-section of an external jacket or shell for the reaction chamber shown in Fig. 1.

This arrangement will be readily understood on referring to Fig. 2 of the drawings, which shows the arrangement diagrammatically in cross-section through the outer shell, jacket or envelope of the furnace. 11 again indicates the location of the furnace chamber, which is surrounded with an insulating layer 40 against heat radiation or lagging, consisting, for example, of kieselguhr or infusorial earth. Then follows the usual layer 41 of brickwork. The whole is finally surrounded or enclosed by a jacket or shell 42 of a material impervious to the highly active gas at low temperatures, for instance sheet iron or any other suitable metal.

It will be readily understood that the invention is by no means limited to the constructions shown by way of example. It is particularly valuable for the breaking up of such materials which are capable of being broken up by highly active gases at high reaction temperatures, for instance for the breaking up of beryllium, titanium, zinc, cadmium, mercury and vanadium ores and others. As highly active gases come into consideration the halogens and their compounds or mixtures, such as chlorine, bromine, iodine, fluorine, their hydrogen compounds, their carbon compounds, such as carbon tetrachloride, hydrogen and carbon monoxide. As materials not liable of being attacked by these substances are particularly suitable carbon as well as the carbides.

By the arrangement according to the invention the highly active gases may outside the reaction chamber be heated to very high temperatures with apparatus particularly suitable for this special purpose, for instance in electric arc or electric resistance furnaces without an interference with the reaction chamber proper being possible from these furnaces. The preheating temperatures may be raised to such a point that dissociation occurs, while in the reaction space itself the gases become operative either in the dissociated state, whereby particularly advantageous effects are obtained in certain cases, or in the associated state.

The heat economy of the processes may according to the invention be increased, if the heat required for the reaction is supplied by means of reactive or indifferent gases and the heating apparatus for the gases is arranged at or in the neighborhood of the supply point of the gases to the reaction space at a distance from the reaction zone. In this way it is possible to transfer the heat applied almost completely to the gases and into the reaction space, without losses of heat occurring during the supply of the gases. The invention is particularly useful for highly reactive gases, and more specifically for that new group of processes which to a steadily increasing extent make use of the high chemical affinity of the halogens or their gaseous hydrogen compounds. By the generation of the heat at the supply zone of the gases in the reaction chamber the complicated and expensive insulations are eliminated, which are otherwise necessary for those strongly heated highly active gases. The heating bodies for heating the gases, which are located in the reaction chamber itself, and, as a rule, are so located that they are accessible from the outside, in our improved arrangement come in contact with none of the initial substances and only with such gaseous components of the chemical conversion against which they are indifferent or neutral.

The bodies extending into the reaction chamber may according to the conditions prevailing be arranged at any desired side of the reaction chamber, at the top, at the side or at the bottom. They may project freely into the reaction room or be supported or enclosed in any suitable manner.

The arrangement according to our invention thus represents a novel internal heating system, in which the heat is not supplied to the entire reaction material itself, but merely to the gaseous components or inert accompanying gases at their entrance into the reaction chamber. These then act as heat carriers from the heating body to the reaction material.

By heating the gases separately from the reaction material further considerable advantages result, apart from the avoidance of heat losses by radiation towards the outside. Thus the reaction material or charge becomes substantially uniformly heated. At the same time it is possible to supply the heat at those points where the application is most advantageous in view of the conditions prevailing. Amongst other advantages a substantial saving in construction material for the furnace is obtained, while, on the other hand, the heat is supplied at such points where the process may be influenced most favorably or the heat be stepped or increased within the reaction chamber.

We have, furthermore, made the surprising discovery that the heating bodies, if merely in contact with gases have a far greater technical durability than when the heating takes place together with the reaction material. This is the case particularly when employing highly reactive gases. Here we found an unexpectedly high resistance of many materials against the highly reactive gases to be heated, even at high temperatures. Thus, for instance, hard porcelains of all kinds, argillaceous materials, zirconium oxide and other ceramic substances, furthermore carbon, graphite and so on, are not attacked by hydrogen, the halogens or their hydrogen compounds up to very high temperatures, for example carbon or graphite up to 3000° C. The arrangement according to our invention thus enables carbon heating bodies to be employed without any protective layer or coating even in so highly reactive gases as chlorine gas, bromine gas, hydrochloric acid gas, hydrobromic acid gas, hydrofluoric acid gas and so on. By the substantially better heat transfer from the heating body to the gas, it is possible to manage with far smaller heating surfaces than is possible with insulated heating bodies and yet to impart to the flowing gas a considerably higher temperature, which is a substantial technical advantage over the hitherto employed complicated and expensive arrangements.

By the heating apparatus according to our invention it is thus possible to heat gases, such as the halogens or their compounds to temperatures above 1500° C. in a decidedly economic manner.

By the arrangement of the heating bodies at the point of admission of the bases into the reaction chamber the vaporous or gaseous products of reaction are kept off the heating bodies, whereby in many cases an increased durability results, for instance in the chlorination of oxidic ores with chlorine or hydrochloric acid gas, in which oxygen itself or oxygen containing gases, such as water vapor, is generated, and carbon or graphite heating bodies are employed. If in such a case the reaction products, i. e. oxygen or water vapor, meet with the highly heated carbon, the heating bodies would be destroyed in a very short time. This danger is thus avoided by the arrangement according to our invention. It may be reduced to a minimum by allowing the gases to be heated to enter the reaction chamber at a high flow velocity.

The arrangement of the heating bodies at the place of entrance of the gases permits at the same time of a good utilization of the heating surface of the heating bodies, as it is possible with the arrangement according to our invention to bring the heating bodies in contact with the gases to be heated from all sides, the gases sweeping along the outer surfaces as well as being passed through any internal cavities or spaces of said bodies provided therein. The sealing of the reaction chamber towards the outside is also greatly facilitated thereby.

The heating of the gas heating bodies may take place in any suitable manner. Thus highly heated gases may be conducted through jackets or shells or spaces in the heating bodies. Surface combustions, pulverized fuel or oil combustions may take place in the heating bodies. In this case heating bodies will be employed, which consist of a plurality of boxed together hollow units, preferably of tubular construction, through the outer spaces of which pass the heating gases or other heating agents, while through the inner spaces and around the external confinement surfaces are conducted the gases to be heated.

The heating bodies may consist of any suitable material. Materials preferably employed are carbon, graphite, or silicon carbide mixtures. The supply of the fuel to the heating bodies is so adjusted that the heating atmosphere assumes a reducing or de-oxidizing nature.

Particularly favorable designs and simple constructions result if the pipes which supply the gases to the reaction chamber are at the same time designed as heating bodies and, for instance, are fitted with electric heating devices. These heating bodies may then completely or partly protrude into the furnace.

In Figs. 3 and 4 there are by way of example illustrated two constructions, in which pipes consisting of electrically conducting material or covered with such a material extend in two or more rows parallel or substantially parallel to one another and at their inner ends are connected by plates, frames or the like of likewise conducting material, or carry such members or are carried by them.

In Fig. 3 of the drawings 50 is an inner pipe and 51 an outer pipe, both consisting of graphite. These pipes or tubes are arranged concentrically and at their conically expanded or contracted ends 52, 53 carry loosely a plate 59, likewise of conducting material, preferably graphite. If these pipes 50, 51 are connected to a suitable source 56 of electric current through the conductors 54, 55, the heat necessary for heating the gases is generated by the resistance of the pipes. This arrangement ensures an adequate electrical connection of the parts with each other, but permits of the unrestricted expansion of all parts under the action of the heat. Preferably the plate 59 is provided with ducts or passages 57, so that the gas to be heated is able to flow also within the pipes or between the two pipes. In the reaction chamber itself the gas supplied by the pipes or through further pipes may also flow around the heating pipes from outside. Preferably the electrical resistance of the inner pipe is chosen higher than that of the outer pipe, so that the higher temperatures are developed in the inner space of the heating body.

In order to protect the place of juncture of the heating bodies at the wall of the reaction chamber against high temperatures, a radiation protection is provided in the example illustrated, which consists of one or more flange rings 60, 61 of a durable material, for instance carbon, graphite or masonry, located concentrically to the heating body, so that the wall of the furnace is protected against the heat radiated by the heated pipe. An additional protection against heat radiation may be provided by making use of further currents of inactive gases, or active gases in the inactive, more particularly, the cold state. By means of the pipeline 64 and the passage openings 66, 67 cold gas, such as chlorine gas or nitrogen as radiation protection and for increasing the temperature gradient may be blown into the reaction chamber towards the sides of the heated gas current concentrically to the heated gas.

The pipes 50, 51 are supported by the cover plates 150, 151, which may likewise consist of carbon or graphite. For the heat insulation or for the electrical or chemical insulation or all of them at the same time, the holding flanges 167, 68 of the cover plates are supported in masses 69, 70 of insulating material chemically inert to the pipes and the gases passed through them, or the flanges may float in them. These insulating substances are located in suitable recesses, cavities, troughs or the like of the brickwork 58. If the gases employed are halogens or their compounds, such as clorine, iodine, fluorine, bromine, hydrochloric acid gas, hydrobromic acid gas, hydriodic acid gas, hydrofluoric acid gas, and the pipes or heating bodies are made of carbon or graphite, the insulating masses consist preferably of halogen salts, for instance sodium chloride, potassium chloride, calcium chloride or barium chloride or the respective fluorides in the solid or liquid state or their mixtures.

To the holding plate 150 of the inner pipe is in suitable manner connected the feed pipe 71 of the gas supply conduit.

The plates or flanges 150, 151 are in comparison to the wall of the pipes rather thick, in order to avoid excessive heating of these holding parts. The flange 150 of the inner pipe covering the flange of the outer pipe is preferably provided with openings 74 through which the gas is able to pass into the space 75 between the two pipes. The flange 151 is also provided with openings or bores 73 through which the gas flows to the outer surface of the pipe 51. Intermediate insulating pieces 62 can be fitted between the plates 150 and 151 in order to separate the currents of gas to be heated from those serving as a protection against radiated heat. The intermediate pieces may consist of insulating material or be provided with insulating masses described with reference to the parts 68, 69 which hold or carry the upper plate 150 by means of holding lugs or flanges, not shown in the drawings.

Fig. 4 of the drawings illustrates a further example of a resistance heating device for the pipes. Two or more pipes, 76, 77 spaced at substantially equal distances from the center of the cover, are provided with outwardly directed oblique ends 176, 177, which carry a connecting plate 78 with corresponding openings.

Fig. 5 of the drawings illustrates an example of an electric arc heating arrangement of two pipes 81, 82, which are concentric and extend parallel or substantially parallel to each other, the arcs being set up by applying electrically conducting means connected with an electric current source 56 to the two pipes between the adjacent walls of the tubes, for instance at 80. In the example given the two flanges 83, 84 of the pipes are in suitable manner, not shown, clamped against the cover plate 58 and insulated. To initiate the striking of the arc the pipes are at suitable points of the inside provided with points, projections or the like, as indicated at 80.

Figs. 6 to 9 of the drawings show further embodiments of our invention, which permit of the reaction material being treated differently according to the desired conditions in the chamber.

In the embodiment illustrated in Fig. 6 of the drawings the material to be treated, such as ore, is contained in a vertical shaft or kiln 90 constructed of masonry, which is not shown in the drawings. The supply of heated gases or gases to be heated at the point of supply, takes place at the diagrammatically indicated supply points 91, 92, 93. The raw material is introduced into the furnace through the charging hoppers 94. The arrangement is such and the heating of the heating points 91, 92, 93 takes place in such a way that the reaction material in the reaction chamber travels from the top downwards within the range of higher temperatures. At the same time care is taken, as shown in the illustrated example, that the reaction material travels to the ranges of higher temperatures downwards at a retarded velocity. This is effected, on the one hand, by the heating points or the supply points of the heated gases 91, 92 and 93 respectively being stepped sideways and downwardly, and, on the other hand, by the reaction chamber becoming gradually wider towards the bottom, for instance at 95, 96, in the manner of terraces. When the process is finished the residues accumulate in the sump 97 of the reaction chamber. The points of escape 99, 100, 101, 102 for the volatile reaction products are stepped in the direction of the height, the stepped heating points or supply points of the heated gases facing discharge points of the volatile reaction products, being preferably located a little higher. The gastight running off takes place at 98.

By this arrangement according to our invention it is possible to operate the furnace continuously. Even in the case of large quantities of the material to be worked up in the furnace the reaction gas traverses only comparatively thin layers of the ore or other material to be treated, so that the danger of the furnace choking is entirely avoided. During the sinking down the ore turns over, because it reaches larger furnace cross-sections, or simply for the reason that it slips down. In this way fresh surfaces are again and again exposed on which the reaction is able to become operative. Local congestions are effectively eliminated. The finer material does not cause caking but drips down. At the same time the cold ore or raw material added from above is by radiation heated and dried by the material undergoing reaction.

In the embodiment of our invention illustrated in Fig. 6, the material remains a comparatively long time in the lower reaction chambers, in which, at the same time, prevails the highest temperature, so that in this part of the furnace the parts to be chlorinated capable of being broken up with difficulty are for particularly long periods subjected to the action of the reactive gas, chlorine gas. At the same time the higher surface effect, which takes place with the sinking down of the material into the lower zone of the furnace and which is effected by the reduction of the size of the particles by the reaction in the upper zones, the breaking-up, chlorination, of the constituents capable of being chlorinated only with difficulty is greatly promoted.

The arrangement will preferably be such, that the temperature or the quantity of heat supplied or both of the heating points stepped at the reaction chamber is increased from the top towards the bottom. This increase of the quantity of heat applied towards the bottom may, in particular, be attained by increasing the number of heating points from the top towards the bottom.

Figure 8:
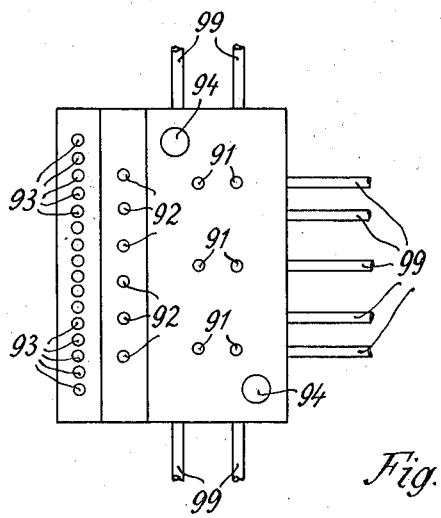
Fig. 8 is a plan of an arrangement like that shown in Fig. 6.
Figure 9:
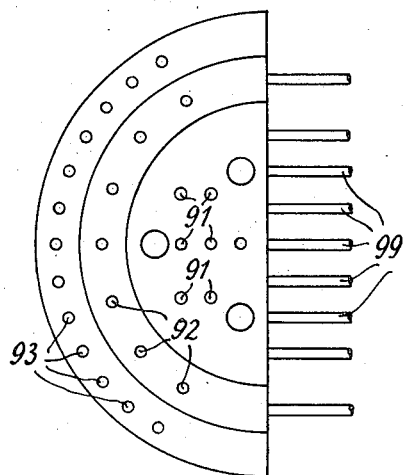
Fig. 9 is a plan of an arrangement of another form of chamber similar to Figs. 6 and 7.

Figs. 8 and 9 show two modifications of the arrangement according to Fig. 6. Here the number of the heating points 91, 92, 93 increases from terrace to terrace, so that the heat is more intense at the lowest terrace.

It will be understood that the horizontal section through the furnace needs not necessarily be rectangular, but that it might equally well be semi-circular, as shown in Fig. 9, or elliptical or polygonal. The number of heating places on the individual steps or terraces may vary within wide limits.

By adjusting the temperature in the individual steps of the furnace, in particular by increasing the temperature from the top towards the bottom, a selective volatilization-chlorination can be carried out in continuous operation and in one chamber. Since the temperature in the individual zones of the furnace rises towards the bottom from zone to zone, the result can be attained that in the upper zones the ore gives off only the more easily volatilizing-chlorinatable constituents and only in the lower zones the constituents volatilizing with difficulty. As the products obtained are discharged through the nearest outlet 99, 100, 101, 102 respectively, the selective chlorination can be carried out continuously in a single operation. As the quantity of heat applied may easily be adjusted and determined by the number of heating points, the temperatures may be kept comparatively low at the various supply points, so that the construction material of the furnace is saved.

By choosing a semi-circular or otherwise polygonal horizontal cross-section for the furnace a uniform increase of the heating points from top to bottom may easily be obtained. At the same time a uniform distribution of the temperature and the flow of gas in the treatment chamber may be obtained in this way. By the elimination of sharp corners dead spaces are avoided in which no or only a slow conversion might take place.

Through the various heating points may pass different gases according to the nature of the process to be carried out and the specific treatment; reactive gases if a fresh supply of the reactive gases is desired at the respective points, inert gases if merely heat is to be supplied to the respective zone. The height of the individual steps or terraces is so chosen that the current of gas or the current of volatilized constituents produced by the gas has to traverse the shortest path or the path of lowest resistance to the discharge point assigned to it. In this way it is possible to separate the various volatilization products, or chlorination products. The number of outlets will be chosen or adjusted according to the quantity of the products obtained. For the same purpose the cross-section of the outlets may be differently chosen or differently adjusted.

The travel of the material from the top towards the bottom with the prescribed velocity within the various zones of the furnace towards the zones of higher temperatures located at the bottom may also be attained by providing the reaction chamber with an inclined surface or sloping bottom 110, upon which the reaction material slides downwards as the reaction proceeds. By adjusting the stepping of the heating points 91,

92, 93, 193, and by a suitable choice of the inclination of the slope or gradient, the result may be obtained that the vertical thickness of the layer of the ore or other material to be treated decreases from the top downwards, as corresponds with the advanced state of reaction, so that the material broken up to a higher extent has thinner layers and shows a shortened duration of the treatment. It is also possible, as shown in the example illustrated in Fig. 6, to step the heating points and the outlet points and to arrange them relatively to one another in such a manner, that by the stepping and the setting of the temperature a selective volatilization takes place in continuous operation and in a single chamber, the height of the terraces or steps between the individual heating zones 91, 92, 93, 193 and the arrangement of the outlets 99–103 respectively corresponding with the nature of the individual volatile reaction substances.

By reference to Figs. 6 and 9, it will be apparent that adjacent inlets 91 are spaced closer together than the distance from such inlets to the outlets 99 coordinated therewith. This arrangement is also true with reference to the inlets 92, 93 and the coordinated outlets 100, 102. Also, the inlets 93 at the lower portion of the structure can be closer together than the inlets 92 which in turn can be closer together than the inlets 91, as shown in Fig. 8.

As an example we proceed to describe a selective chlorination:

If an ore, for instance, containing iron as sulphide as well as oxide, and also vanadium and titanium, is treated with chlorine, the temperature of the hot chlorine gas supplied will in the topmost zone at 91 not amount to much above 300° C., for example. The iron chloride escaping at this temperature is pure and escapes through 99. It originates from the iron sulphide. The temperature of the heating heads of the zone 92 will already amount to about 550–600° C. The current of chlorine from 92 to 100 carries the vanadium along in the form of a chlorine compound. The temperature of the zone may amount to 800–850° C. Through 101 and 102 escapes the entire iron of the ore chemically combined with oxygen, in the form of a chlorine compound. The temperature of the zone 193 is assumed to amount to about 1100° C. Through 103 escapes the entire titanium in the form of a chlorine compound.

In this example also the path from the heating point to the respective outlet point of the volatile products is made shorter than to the other discharge point; at the same time the absolute length of the heating paths decreases towards the bottom. By this construction of the furnace the result is again obtained that the danger of clogging is eliminated, which might otherwise arise, if as in the lower part of the furnace the materials or ores have already become finely granular and frequently soft and crumbly by the preceding treatment or chlorination.

In constructing this furnace the general outline shown in Fig. 6 may be employed and various cross-sectional contours can be selected, e. g., according to the shapes of the furnaces shown in plan in Figs. 8 and 9.

The outlets or discharge points 99, 100, 101 and so on are strongly cooled preferably directly at the furnace, by enclosing them in jackets through which circulates a suitable cooling medium, for instance water or solutions to be heated in the works. The cooling may also be effected by means of cold reaction gases inactive or inert at the point of discharge or by inactive or inert gases, the arrangement being the same as shown in Fig. 1 at 32 or in Fig. 3 at 66. In this way the result is attained that the chemical balance is not again displaced in the reverse direction, as might happen if the cooling takes place slowly only.

In a preferred embodiment of the invention the escaping volatile substances or gases are conducted through pipes of metal, preferably iron or steel. The fact that iron or steel tubes may here be employed with advantage, is surprising because the iron reacts at higher temperatures with the reactive gases, more particularly with chlorine. As in the arrangement according to the invention the discharge or outlet points are cooled and the iron has furthermore a high heat conductivity, the wall itself can never reach such a high temperature as would be necessary for the starting of the chemical transformation.

We claim as our invention:

1. A furnace for treating materials by means of a heated active gas comprising walls of a material non-reacting with the material to be treated and defining a reaction chamber, the upper portion of said reaction chamber providing a protecting space not filled with the material to be treated, and a two part furnace cover of a material non-reacting with the active gas, one cover part being arranged on top of the other and being insulated from the other, each of said cover parts being provided with a pipe of conducting material protruding into said protecting space, the pipes of the cover parts being arranged substantially coaxially and being adapted to cause a high electric resistance, and the protruding ends of the pipes conductingly connected to one another, an electric current source, said cover parts being connected to said source, joints between the walls and cover being disposed where a lower temperature prevails than necessary to cause a reaction of the material of the cover with the active gas in the presence of the material of the walls.

2. A furnace for treating materials by means of a heated active gas comprising walls of a material non-reacting with the material to be treated and defining a reaction chamber, the upper portion of said reaction chamber providing a protecting space not filled with the material to be treated, and a two part furnace cover of a material non-reacting with the active gas, one cover part being arranged on top of the other and being insulated from the other, each of said cover parts being provided with a pipe of conducting material protruding into said protecting space, the pipes of the cover parts being arranged substantially coaxially and sufficiently distanced therefrom to allow the creation of an electric arc, an electric current source, said cover parts being connected to said source, joints between the walls and cover plates being disposed where a lower temperature prevails than necessary to cause a reaction of the material of the cover with the active gas in the presence of the material of the walls.

3. A reaction furnace for treating materials by means of a heated active gas, comprising walls of a normal ceramic substance defining a reaction chamber, said reaction chamber having an inlet opening for introducing the materials to be treated, the walls of said reaction chamber forming corners which protrude into the path of introduction of the materials into said chamber to provide a space in the reaction chamber not filled with the material to be treated, a furnace cover consisting of a material differing from the material of the rest of the walls and non-reacting with the heated gas, but not inert to reaction with the gases in the presence of the material of the rest of the walls or in the presence of the material to be treated, said cover covering the space not filled with the material to be treated, said cover having an opening formed with a nozzle for introducing the heated gas in a free jet through the protecting space to the material to be treated, said chamber forming a reaction zone at the point where the jet impinges upon the material, means for providing lower temperature protective zones separating the chamber walls from the jet of the heated gas and from the reaction zone, the joint between the cover and the walls being disposed at a substantial distance from the cover opening and from the material to be treated and in the protective zone surrounding the jet of gas.

4. A furnace according to claim 3, and means located adjacent the inlet opening for heating the active gas to the temperature necessary for the reaction.

5. A furnace according to claim 3, and said opening being provided with inlet pipes for the gas, said pipes being capable of conducting an electric current, an electric current source, the ends of the pipes connected to the source and said source being adapted to heat said pipes to a high temperature.

6. A furnace according to claim 3, and said opening being provided with inlet pipes for the gas, said pipes protruding into the protecting space, and means for heating the pipes.

7. A furnace according to claim 3 and the upper extremities of said walls having recesses filled with a material chemically neutral in respect to the active gas, to the material of the furnace cover and to the walls of the furnace, said cover having flanges extending into said recesses and being carried by said chemically neutral material.

8. A furnace for treating materials by means of a heated halogenizing gas according to claim 3 and the upper extremities of said wall being provided with recesses filled with alkaline halogen salts, the cover having flanges extending into said recesses and being carried by said salts.

9. A furnace according to claim 3, and said cover being provided with one or more chambers surrounding the opening for introducing the heated gas, means for passing a current of gas colder than the heated active gas through said chambers, said chambers being disposed between said inlet opening and the joints of said walls and cover.

10. A furnace according to claim 3, and shielding means provided on said cover to shield the joints between the cover and walls from heat rays proceeding from the inlet opening, the shielding means having said inlet opening formed therethrough.

11. A furnace for treating loosely mixed materials by means of a heated active gas comprising walls of a material non-reacting with the materials to be treated, said walls defining a reaction chamber, said chamber having a plurality of inlet ports, means for continuously feeding the material to be treated through said ports to the reaction chamber, said reaction chamber having a plurality of protecting recesses formed by corners which protrude from the upper side into the path of the material to prevent a filling of the protecting recesses with the material to be treated, a plurality of covers composed of materials non-reacting with the active gas said covers covering the spaces not filled with the material to be treated and each having one or more inlet ports formed with a nozzle for introducing the heated gas in a free jet through the protecting space to the material to be treated, said covers defining with the furnace walls a plurality of reaction zones, means for maintaining the temperature in said recesses lower than that of the reaction zone of the chamber, said furnace walls having a plurality of outlet ports, each of said covers and each of said outlet ports being coordinated to a definite one of said reaction zones, joints between the walls and covers being disposed adjacent the protecting recesses where lower temperatures prevail than necessary to cause a reaction of the materials of the covers with the active gas in the presence of the material of the walls.

12. A furnace according to claim 11 and said covers with their inlet ports forming echelons at the one side of the reaction chamber and said outlet ports being arranged at the opposite side of the chamber.

13. A furnace according to claim 11 and said covers having the inlet ports formed therein and forming echelons at one side of the reaction chamber, said outlet ports being arranged at the opposite side of the chamber, the wall of said opposite side being inclined in correspondence with the echelons to allow the material to be treated to pass downward at uniform speed.

14. A furnace according to claim 11 wherein the distances between the inlet ports and the coordinated outlet ports decrease toward the bottom of the reaction chamber.

15. In a furnace according to claim 11 wherein said covers are arranged at different levels and have said inlet ports formed therein, the number of inlet ports of the covers increasing from the upper cover to the lower cover to increase the supplied amount of heat.

16. A furnace according to claim 11 wherein said walls of the reaction chamber have horizontal cross sections in the form of sectors of annuli.

WALTHER KANGRO.
AGNES LINDNER.